United States Patent Office 2,865,468
Patented Dec. 23, 1958

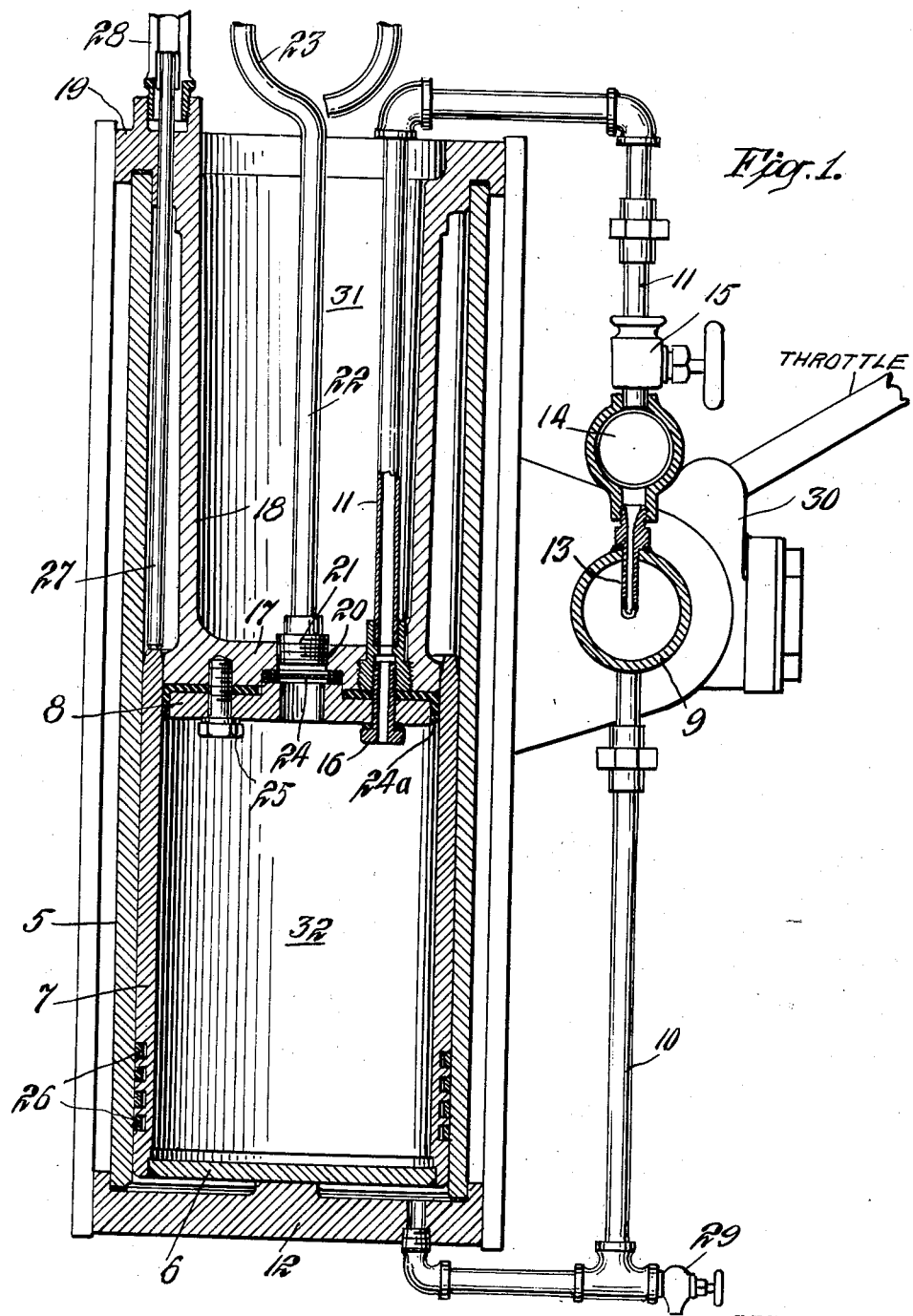

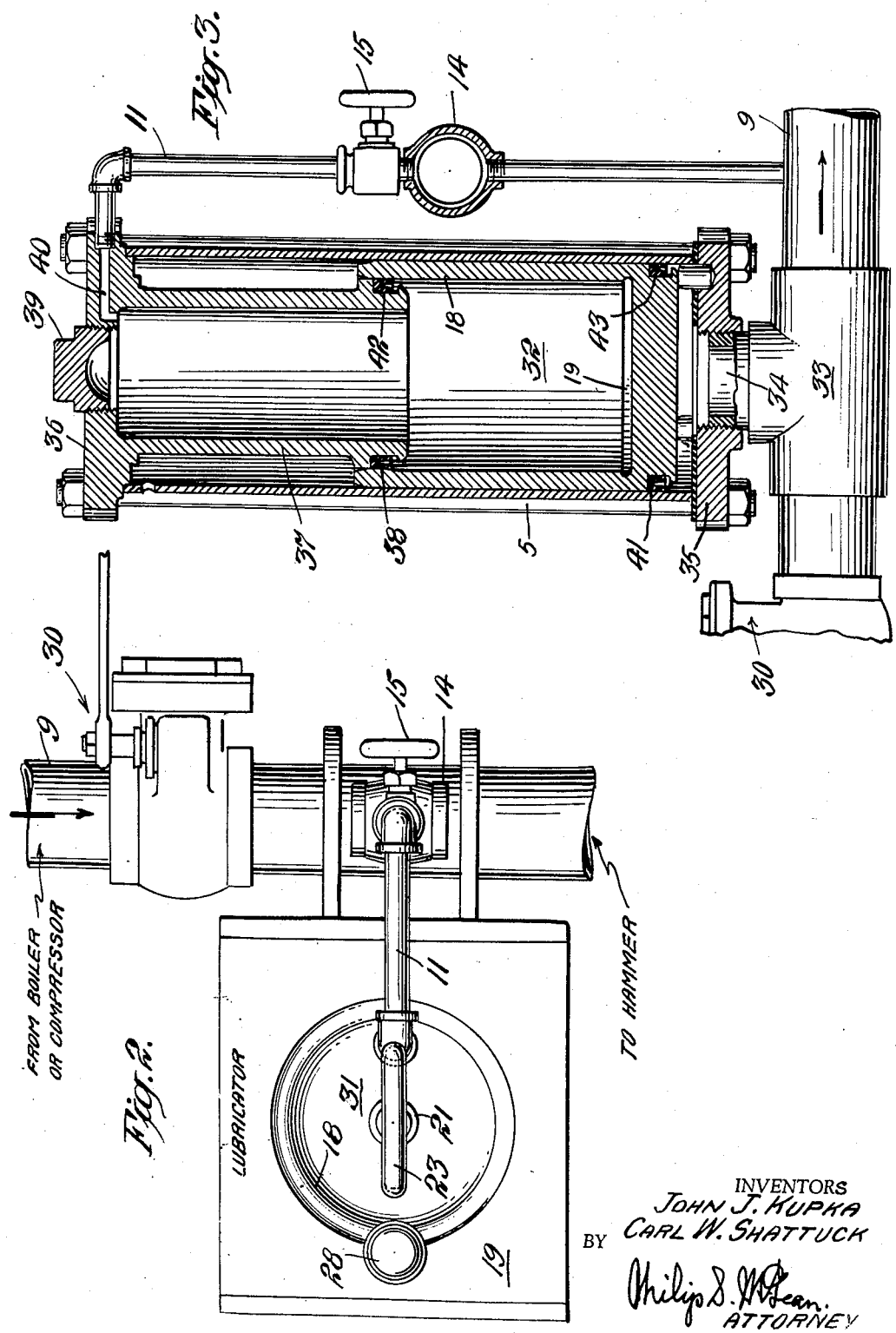

2,865,468

PRESSURE FLUID OPERATED INJECTOR FOR LUBRICATION AND OTHER PURPOSES

John J. Kupka, Gladstone, and Carl W. Shattuck, Mountain Lakes, N. J., assignors to McKiernan-Terry Corporation, Harrison, N. J., a corporation of New Jersey Application March 8, 1957, Serial No. 644,829

1 Claim. (Cl. 184—39)

The invention herein disclosed relates to the injection of lubricant or other medium into a gaseous pressure body such as steam or compressed air, utilizing pressure of the same to effect the injection.

While not so limited, the invention has been found of special value for the lubrication of steam and air driven power hammers.

These tools and particularly the heavy pile driving hammers, because of their size and weight, should have plentiful lubrication and at the same time, they are subject to conditions which may limit or actually preclude proper lubrication.

The pile hammers are operated in the open and subjected to outdoor working conditions, such as overnight freezing temperatures which would congeal the oil, preventing starting and slowing down the running and causing injury such as scoring of the ram and cylinder.

The important objects of this invention are to overcome and avoid these difficulties and to insure in this instance proper lubrication of the parts before actually starting the machine.

These objects have been accomplished by the provision of a differential piston and cylinder forming a reservoir for lubricant and connected at opposite sides with the steam or other pressure supply line running to the tool so that with use of the throttle, pressure fluid, steam in the supposed instance, may be eased to the tool in sufficient volume to heat without starting the same, and with the differential of the pressure applied to opposite ends of the lubricator, providing sufficient pressure for injecting the lubricant into the warming volume admitted to the machine.

Further special objects of the invention are to provide a differential pressure operated lubricator and injector of this character which can be produced at low cost and be readily applied and used with pressure operated machines now in use and which will be of simple, rugged construction requiring no special care or attention, ready to go into service when required and automatically cutoff when the machine is shut-down.

Other desirable objects attained by the invention and further novel features are set forth and will appear in the course of the following specification.

The drawings accompanying and forming part of the specification illustrate present practical embodiments of the invention but structure may be modified and changed as regards this illustration, all within the true intent and scope of the invention as hereinafter defined and claimed.

Figure 1 is a broken vertical sectional view showing the invention in the form of a lubricator as connected in the steam line of a pile driving hammer.

Figure 2 is a broken top plan view of the same.

Figure 3 is a broken vertical sectional view showing a smaller capacity form of the reservoir as connected in on the steam supply line.

Considering the invention embodied in the form of a lubricator for a power hammer, there is shown in Figs. 1 and 2 a differential form of cylinder and piston oil reservoir comprising an upright cylinder 5, a hollow piston 6 having a skirt 7, operating in the lower portion of said cylinder, and a fixed piston head 8 within and cooperative with the inner surface of said skirt.

This relation provides a desired differential for effecting actuation of the piston by equal pressure admitted to opposite sides of the piston.

This actuating pressure is taken from the steam supply line 9, by one connection 10 directed to the lower, outside, which in this case is the larger exposed surface of the piston and by a second connection 11 extending from the same source to the upper, smaller side of the piston.

The first connection is shown as simple piping extending from the steam line through the lower cylinder head 12 and the second connection is shown as comprising sequentially connected injector tube 13 entered in the top of the steam line, gage glass 14, needle valve 15, and a ported bolt 16 in the stationary piston head 8.

This stationary head is shown as carried by a supporting head 17, closing the lower end of a dependent annular extension 18 of the upper cylinder head 19, the interior of which is intended and may be utilized as a receiving funnel for the oil which is supplied to the lubricator.

For the latter purpose, the supporting head 17 is shown as having a filling opening 20 closed by a screw plug 21 on the lower end of rod 22, the latter having a hand ring 23 at the top by which the filling plug may be removed and replaced.

A screen 24 is shown interposed between the supporting head and stationary head 8 and a cup packing 24a is shown clamped between these two heads making sealing engagement with the inside of the annular piston wall. The ported bolt 16 and other bolts 25 secure the heads and packing in assembled relation.

The annular or skirted portion of the piston is indicated as sealed in the cylinder by packing rings 26.

A contents indicator is shown in the form of a rod 27, riding on the upper end of the piston skirt and slidingly projecting up through an indicator gage tube 28 on top of the lubricator.

The lower end of the cylinder is shown as having a drain valve 29 located in the lower pressure connection 10.

The steam supply line 9 is shown as having a throttle valve 30.

It will be noted in Figs. 1 and 2 that the pressure connections to the top and bottom of the differential lubricator cylinder are taken off from the steam line at the downstream side so that pressure will be admitted to the lubricator only when the throttle is open and will be cutoff from the lubricator when the throttle is closed.

The capacity of the filling chamber 31 in the hollow top of the lubricator cylinder may be equal or substantially equal to the capacit yof the reservoir chamber 32 inside the piston to provide a measure for the oil necessary to fill the lubricator and a convenient container and funnel for holding and feeding the oil to the reservoir when the filling plug is opened.

In operation, the feeding pressure on the oil is determined by the difference in area between the outer, larger diameter outside of the piston head and the inner, smaller diameter within the piston. With equal pressure taken off from the steam line and applied to opposite sides, upward movement of the piston will be determined by this difference in area so that full line pressure may be utilized, but light or heavy pressure be applied to supply lubricant as desired to the machine operated by the fluid pressure.

The valve 15 enables the feed of lubricant to be exactly controlled and the gage glass provides visual indication of oil admitted to the steam line.

At the start, the throttle may be cracked to admit a small volume of steam, only sufficient to warm the machine and inject a mist of lubricant to cover working surfaces of the ram and cylinder. As the oil is warmed up and coats the working surfaces, the throttle may be opened to start the hammer with assurance that the ram and cylinder are properly lubricated and can be set in action without danger of scoring or otherwise injuring parts.

The construction is particularly simple and rugged and there is only one moving part, the differential piston.

The unit may be located at any convenient point, preferably closely adjoining the throttle so that it will be warmed to some extent whenever steam is on from the boiler. The same is true for compressed air machines since air from the compressor is usually hot enough to warm the lubricator and keep oil in the reservoir tempered for proper lubrication of the machine supplied.

The preheating stage in which the throttle is opened only sufficiently to warm and coat the machine surfaces with lubricant may vary according to existing conditions.

The pocket in the top of the cylinder provides a convenient receptacle for holding and funneling oil into the reservoir chamber and the gage rod provides constant indication of the amount of oil remaining in the reservoir. The gage glass also serves as an indicator of oil supply as well as a constant indicator of amount being fed.

The drain valve 29 at the bottom of the cylinder may be opened when the machine is shutdown to release condensation and make sure that there will be no freezing of condensate in the cylinder under extreme cold weather conditions.

Figure 3 illustrates a smaller size, compact embodiment of the invention operating on the same general principles and embodying the same general features.

In this construction, however, the lubricator cylinder is mounted directly on the steam or compressed air supply line 9 by T-connection 33 having the branch 34 directed upwardly, the lower head 35 of the cylinder being fitted to screw directly over this branch, thus to put the lower end of the cylinder in constant connection with the supply line, at the machine side of the throttle.

One prime advantage of this arrangement is that the lower pressure end of the cylinder will always automatically drain when the throttle is closed and the machine shutdown. The steam line will ordinarily have a drain so as to carry off any drainage from the lubricator cylinder.

The steam or compressed air supply pipe is, in this instance, utilized as a convenient and practical support for the lubricator and heat transferred to the lubricator as more effective and direct.

Also in this second construction, the stationary upper head of the reservoir chamber is the top cylinder head itself, as indicated at 36, and this head carries a dependent annular wall 37 sealed to the inner surface of the piston skirt at 38, thus to constitute an upward stationary continuation or extension of the oil reservoir chamber 32.

The upper stationary head 36 is shown as having a screw filling plug 39 and the top pressure connection 10 is shown entered through the side of this head at 40.

Both the seal 38 for the inside of the piston skirt and seal 41 for the piston head are shown as cup packings set into grooves 42 and 43 in the stationary annular wall 37 and movable piston head, respectively.

Constructed as last disclosed, the lubricator can be made lighter and, hence, better adapted for supporting it directly on the steam line.

In both forms of the invention illustrated, the oil as replenished may be preheated, ready to effectively lubricate the hammer.

In the first form, Fig. 1, preheating may be accomplished by loading the well or storage chamber 31 in the top of the cylinder with a charge, ready to be released into the piston chamber 32 when required.

In both forms of the invention, a certain amount of oil may remain in the bottom of the hollow piston when the feed of oil is about terminated. This is particularly true of the second form of the invention, Fig. 3.

This retained hot oil is floated to the top when the heavier or more viscous and cold, or less heated, cylinder oil is introduced into the hollow piston, and hence is first supplied to the hammer while the introduced body of fresh oil is being brought up to the desired operating temperature.

What is claimed is:

For a steam or compressed air pile driving hammer having a horizontally extending steam or compressed air supply pipe with a throttle by which the steam or compressed air may be admitted to start or to warm up the hammer prior to starting, an automatically acting differential pressure operated lubricator for said hammer mounted on said supply pipe so as to derive heat directly therefrom and connected with said pipe at the hammer side of the throttle so as to receive steam or compressed air whenever the throttle is opened to admit steam or compressed air to the hammer, said lubricator comprising a cylinder closed at opposite ends by cylinder heads, one of said cylinder heads having a dependent cylindrical wall of lesser diameter than the cylinder and projecting into the cylinder from said cylinder head, said dependent cylindrical wall being open at the inner end and closed at the outer end, a skirted piston operating in said cylinder and having the skirt of the same surrounding said open-ended cylindrical wall and sealed in oversliding relation therewith and forming in connection with said cylindrical wall a telescopically collapsible pressure creating oil containing feed chamber having a differential pressure relation in the areas exposed to pressure inside and outside said skirted piston, said one cylinder head having an oil filling opening in communication with the interior of said cylindrical wall whereby said pressure feed chamber including said skirted piston may be filled with oil, means on the supply pipe for supporting the lubricator in mounted relation on the pipe and including coupling means for connecting the opposite end of said cylinder with said horizontally extending steam or compressed air supply pipe whereby said cylinder will receive steam or compressed air when the throttle is opened and can drain back into said supply pipe when the throttle is closed, and an oil feed connection extending from said first mentioned end of the cylinder for supplying oil to the hammer, said oil feed connection including visible oil flow control means and being connected in pressure receptive communication with said supply pipe at the hammer side of the throttle whereby differential operating pressure will be applied to said skirted piston when the throttle is opened to start or preheat the hammer and operation of the lubricator will be stopped and the lubricator permitted to drain back into the supply pipe when the throttle is closed.

References Cited in the file of this patent

UNITED STATES PATENTS

| | | |
|---|---|---|
| 1,262,864 | Stevens | Apr. 16, 1918 |
| 2,152,334 | Tear | Mar. 28, 1939 |
| 2,206,089 | Gray | July 2, 1940 |
| 2,793,379 | Moore | May 28, 1957 |

FOREIGN PATENTS

| | | |
|---|---|---|
| 747,286 | Great Britain | Mar. 28, 1956 |